(12) United States Patent
Hibi

(10) Patent No.: US 8,225,210 B2
(45) Date of Patent: Jul. 17, 2012

(54) IMAGE PROCESSING APPARATUS AND CONTROL METHOD

(75) Inventor: Makoto Hibi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1246 days.

(21) Appl. No.: 11/760,353

(22) Filed: Jun. 8, 2007

(65) Prior Publication Data

US 2007/0291337 A1    Dec. 20, 2007

(30) Foreign Application Priority Data

Jun. 19, 2006 (JP) ................................ 2006-168354

(51) Int. Cl.
*G06F 3/00* (2006.01)

(52) U.S. Cl. ............... 715/732; 345/418; 348/231.2; 358/452; 382/309

(58) Field of Classification Search ............... 348/207.1, 348/207.2, 208.99; 396/158
See application file for complete search history.

(56) References Cited

U.S. PATENT DOCUMENTS

| | | | | |
|---|---|---|---|---|
| 5,270,806 A * | 12/1993 | Venable et al. | ............... | 358/500 |
| 5,875,035 A * | 2/1999 | Motosugi et al. | ............. | 358/296 |
| 5,937,136 A * | 8/1999 | Sato | ............... | 386/288 |
| 6,184,860 B1 * | 2/2001 | Yamakawa | ............... | 715/823 |
| 6,229,544 B1 * | 5/2001 | Cragun | ............... | 345/418 |
| 6,317,141 B1 * | 11/2001 | Pavley et al. | ............... | 715/732 |
| 6,373,480 B1 * | 4/2002 | Won | ............... | 715/700 |
| 6,522,418 B2 * | 2/2003 | Yokomizo et al. | ............... | 358/1.15 |
| 6,526,156 B1 * | 2/2003 | Black et al. | ............... | 382/103 |
| 6,593,938 B1 * | 7/2003 | Sakata et al. | ............... | 345/629 |
| 6,654,031 B1 * | 11/2003 | Ito et al. | ............... | 715/723 |
| 6,912,005 B2 * | 6/2005 | Senda | ............... | 348/333.06 |
| 6,968,117 B2 * | 11/2005 | Jinnai et al. | ............... | 386/247 |
| 7,337,403 B2 * | 2/2008 | Pavley et al. | ............... | 715/747 |
| 7,558,418 B2 * | 7/2009 | Verma et al. | ............... | 382/137 |
| 7,697,054 B2 * | 4/2010 | Cazier et al. | ............... | 348/333.05 |
| 7,924,323 B2 * | 4/2011 | Walker et al. | ............... | 348/231.2 |
| 2005/0134947 A1 * | 6/2005 | Tsue et al. | ............... | 358/537 |
| 2005/0216841 A1 * | 9/2005 | Acker et al. | ............... | 715/730 |
| 2008/0068456 A1 * | 3/2008 | Fujii et al. | ............... | 348/130 |
| 2008/0192129 A1 * | 8/2008 | Walker et al. | ............... | 348/231.2 |
| 2009/0141292 A1 * | 6/2009 | Adams et al. | ............... | 358/1.6 |
| 2010/0238483 A1 * | 9/2010 | Nelson et al. | ............... | 358/1.15 |

FOREIGN PATENT DOCUMENTS

| | | |
|---|---|---|
| JP | 08-263255 A | 10/1996 |
| JP | 11-177802 A | 7/1999 |
| JP | 2001-333372 A | 11/2001 |
| JP | 2003-046917 A | 2/2003 |
| JP | 2003-274082 A | 9/2003 |
| JP | 2004-080744 A | 3/2004 |

(Continued)

*Primary Examiner* — Michael Won
(74) *Attorney, Agent, or Firm* — Canon U.S.A., Inc. IP Division

(57) ABSTRACT

An image processing apparatus includes: a display unit capable of displaying image data in a one-image display mode, in which images are displayed one by one, and a multi-screen display mode, in which a plurality of images is displayed at the same time; a selection unit configured to select between the one-screen display mode and the multi-screen display mode; an editing unit configured to edit the image data; and a control unit configured to control the display unit so that when the one-screen display mode is selected by the selection unit, the image data edited by the editing unit is displayed and when the multi-screen display mode is selected by the selection unit, information indicating that the image data is edited is displayed together with the edited image data.

18 Claims, 18 Drawing Sheets

FOREIGN PATENT DOCUMENTS

| | | |
|---|---|---|
| JP | 2004-247906 A | 9/2004 |
| JP | 2004-341901 A | 12/2004 |
| JP | 2005-324512 A | 11/2005 |
| JP | 2006-106316 A | 4/2006 |

* cited by examiner

IMAGE PROCESSING APPARATUS AND CONTROL METHOD

BACKGROUND OF THE INVENTION

1. Field of the Invention

The present invention relates to an image processing apparatus and a control method therefor. More specifically, the present invention relates to an image processing apparatus configured to read digital image data from a recording medium storing digital image data taken with a digital camera, perform at least one processing such as red-eye correction and trimming on digital image data.

2. Description of the Related Art

In recent years, a digital camera has been widely used which converts a photographed image into image data and stores the converted image data on a memory card.

Under such circumstances, a low-cost card direct printing apparatus is proposed, to which the memory card can be attached and in which an operation for printing image data is easy and an image processing apparatus and a printer are integrated.

A conventional card direct printing apparatus includes a card slot into which a memory card can be directly installed. In addition, a conventional card direct printing apparatus includes a display device for displaying various contents, a menu, and image data according to an operation of an operation panel by a user. The conventional card direct printing apparatus is used for generating a print instruction by selecting a desired image from among image data in a memory card.

Japanese Patent Application Laid-Open No. 2004-247906 discusses a printing apparatus that performs various processing on image data in a memory card such as red-eye correction and trimming. In red eye correction, a portion of image data showing a pupil of a person that is red at the time of shooting is corrected to be black. In trimming, an image is trimmed in the shape of a rectangle and printed.

The printing apparatus discussed in Japanese Patent Application Laid-Open No. 2004-247906 employs a red-eye reduction system in which whether an image includes a red-eye phenomenon is detected without an operation by a user and each red pixel in a portion of the image showing a red pupil is changed into a pixel of a specific color.

Japanese Patent Application Laid-Open No. 2005-324512 discusses an apparatus that automatically corrects an aspect ratio in a trimming area in the case where a print paper is changed after a trimming rectangle is designated.

In such a conventional apparatus, a user usually views an image on a display device, designates a trimming area as necessary, designates whether to perform red-eye correction for a desired image, designates a number of prints of the image, and performs printing. At the time of viewing the designated image after these operations are performed, if red-eye correction is already designated on a specific image, an image that has been corrected for red-eye is displayed.

In addition, if trimming is already designated, the trimming rectangle designated by the user is displayed on an image in an overlapping manner, to indicate that the image has been trimmed and at the same time show a size and position of the trimming rectangle.

With a "multi image display" function, in which a plurality of images is displayed at the same time, a user can switch between a one-image display mode and a multi image display mode as the user desires.

As the size of a liquid crystal display of a display device becomes larger, in the case of a one-image display mode, visibility in confirming a result of correction is improved with respect to red-eye correction and display accuracy in a trimming area rises when trimming is designated.

However, in such a conventional apparatus, when the above-described display is performed in the case of a multi image display, the display size of one image is relatively small. Therefore, it is not easy to confirm the corrected image when the red-eye correction is designated.

Furthermore, in the conventional apparatus, when a trimming rectangle is displayed overlapping with an image at the time of designation for trimming, it is not easy to confirm the image in detail and an error in designating the size and position of the trimming rectangle becomes larger.

SUMMARY OF THE INVENTION

The present invention is directed to an image processing apparatus and a control method with which it can be easily confirmed that correction has been set for an image in the case of a one-image display mode, and an image can be clearly viewed with satisfactory visibility in the case of a multi image display mode.

According to an aspect of the present invention, an image processing apparatus includes: a display unit configured to display image data, the display unit including a one-image display mode, in which images are displayed one by one, and a multi-screen display mode, in which a plurality of images is displayed at the same time; a selection unit configured to select between the one-image display mode and the multi-screen display mode; an editing unit configured to edit the image data; and a control unit configured to control the display unit so that when the one-image display mode is selected by the selection unit, the image data edited by the editing unit is displayed and when the multi-screen display mode is selected by the selection unit, information indicating that the image data is edited is displayed together with the edited image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EXEMPLARY EMBODIMENTS

Various exemplary embodiments, features and aspects of the present invention will now herein be described in detail with reference to the drawings. The relative arrangement of the components, the numerical expressions, and numerical values set forth in these embodiments are not intended to limit the scope of the present invention unless it is specifically stated otherwise.

Figure 1:
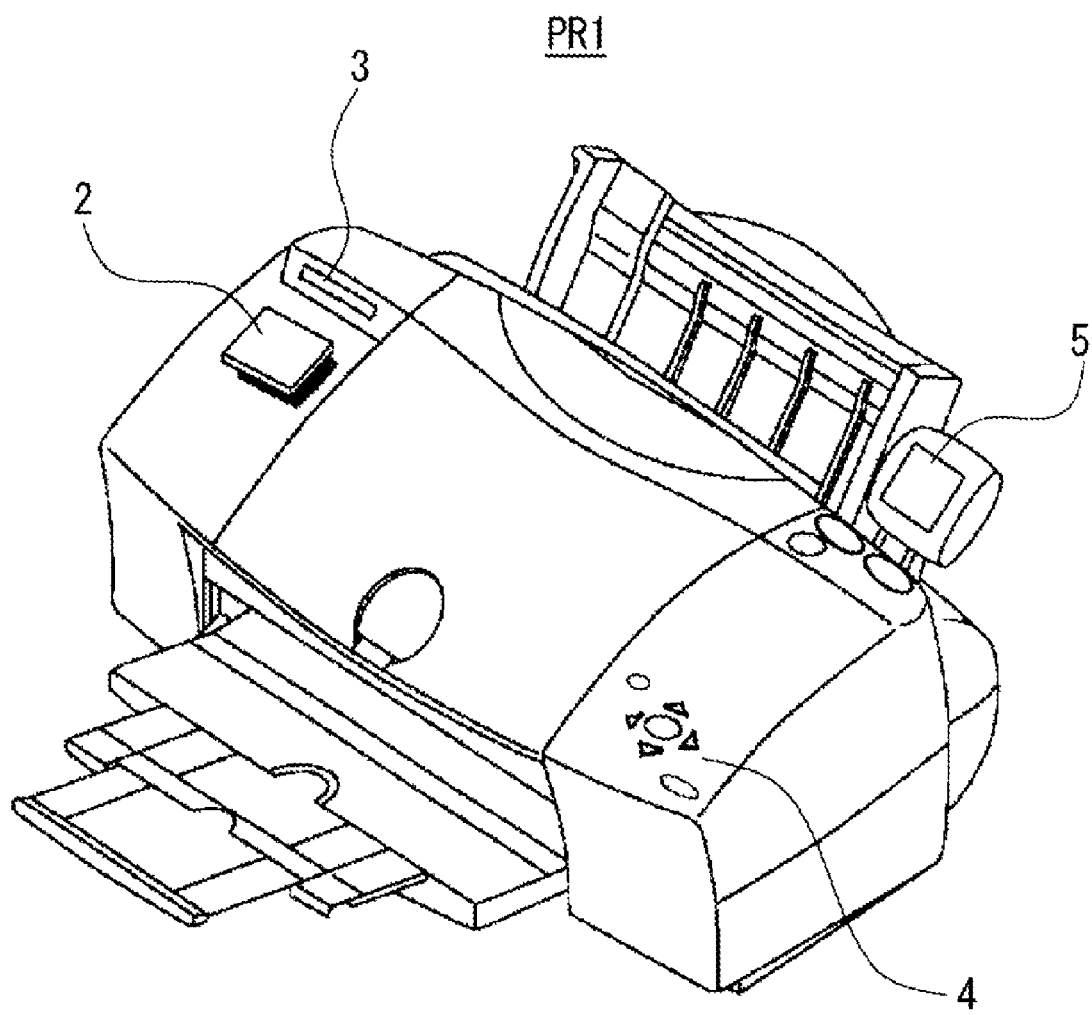
FIG. 1 illustrates an image processing apparatus according to an exemplary embodiment of the present invention.

Now, an exemplary embodiment of the present invention will be described below. FIG. 1 illustrates an image processing apparatus PR1 according to the exemplary embodiment of the present invention.

The image processing apparatus PR1 is an inkjet printer. Note that the present exemplary embodiment can be applied to a thermal transfer printer (including a melting type printer and a sublimation type printer), a dot printer, a laser printer, a light emitting diode (LED) printer, and any other appropriate type printers.

The image processing apparatus PR1 includes a memory card connection unit 3, an operation panel 4, and a display device 5.

The memory card connection unit 3 is a connection unit for reading image data stored in a memory card 2 (i.e., a recording medium). By inserting the memory card 2 into the memory card connection unit 3, the memory card 2 is connected to the image processing apparatus PR1, and in this state, the image processing apparatus PR1 can read image data from the memory card 2.

The operation panel 4 is used for accepting a user operation. The user presses a key provided on the operation panel 4 to select image data to be printed, designate correction of an image, and designate image processing for changing the size of a trimming area and a position of a trimming area.

The display device 5 is, for example, a liquid crystal panel illustrated in FIG. 1. The content displayed on the display device 5 varies according to operation of the operation panel 4 by the user. In one case, after reading image data recorded on the memory card 2, the display device 5 displays an image number unique to the read image and a number of prints of the image data. In another case, the display device 5 displays items used for selecting a print type from a displayed menu and for changing settings for the image processing apparatus PR1.

Figure 2:
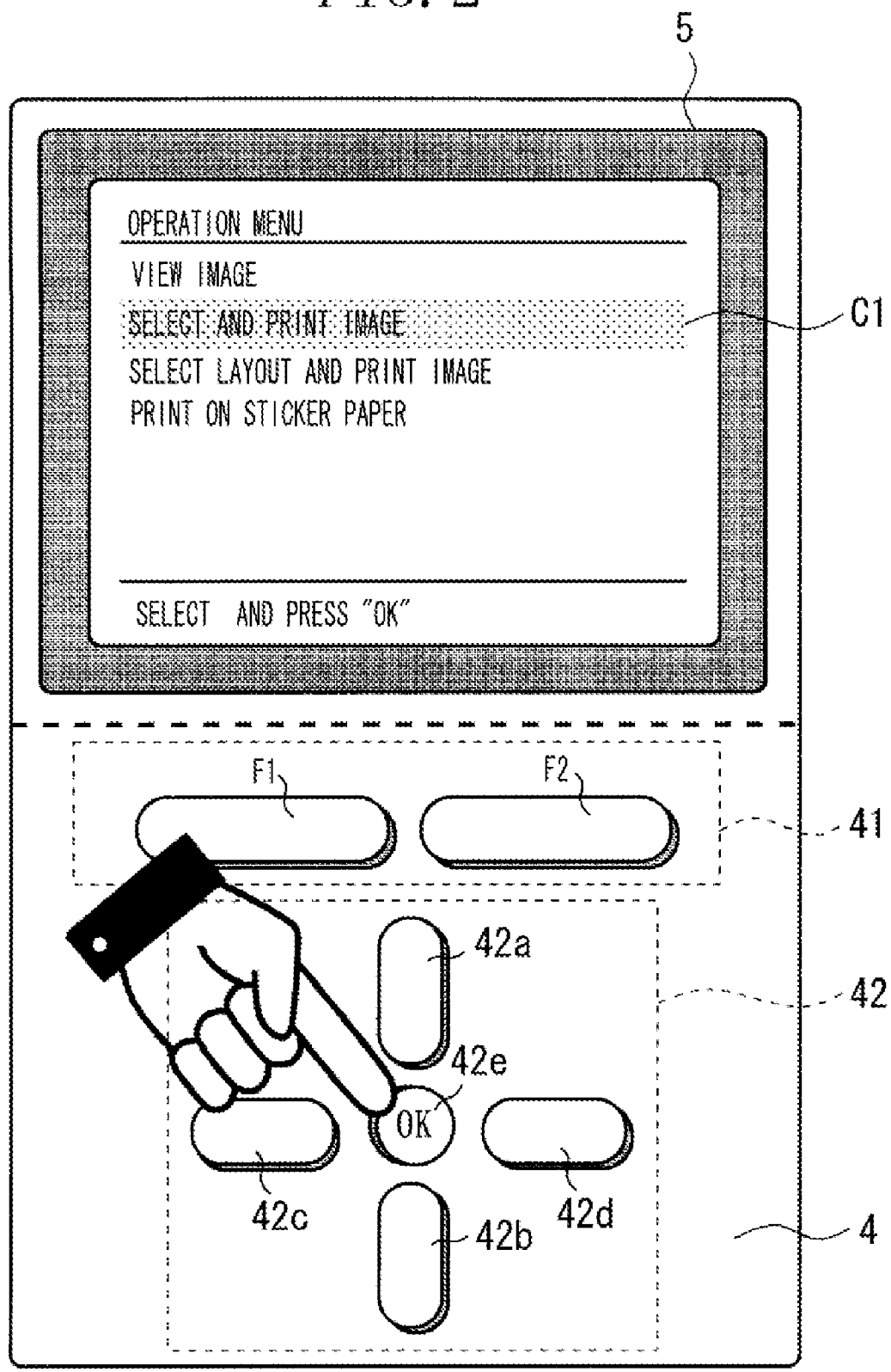
FIG. 2 illustrates an operation panel and a display device according to the exemplary embodiment of the present invention.

FIG. 2 illustrates an example of the operation panel 4 and the display device 5.

In the present exemplary embodiment, when the memory card 2 is inserted into the memory card connection unit 3, a content illustrated in FIG. 2 is displayed.

The operation panel 4 includes a function key 41 and up/down/left/right/OK keys 42 (keys 42a through 42e). The function key 41 includes function keys F1 and F2.

The display device 5, which includes a liquid crystal panel, displays a cursor C1 for indicating an item currently selected.

In the state illustrated in FIG. 2, the functions keys F1 and F2 and the left and right keys 42c and 42d are invalid. When the user selects an item by moving the cursor C1 up (using up key 42a) and down (using down key 42b) and presses the OK key 42e, the processing advances to a next step.

Figure 3:
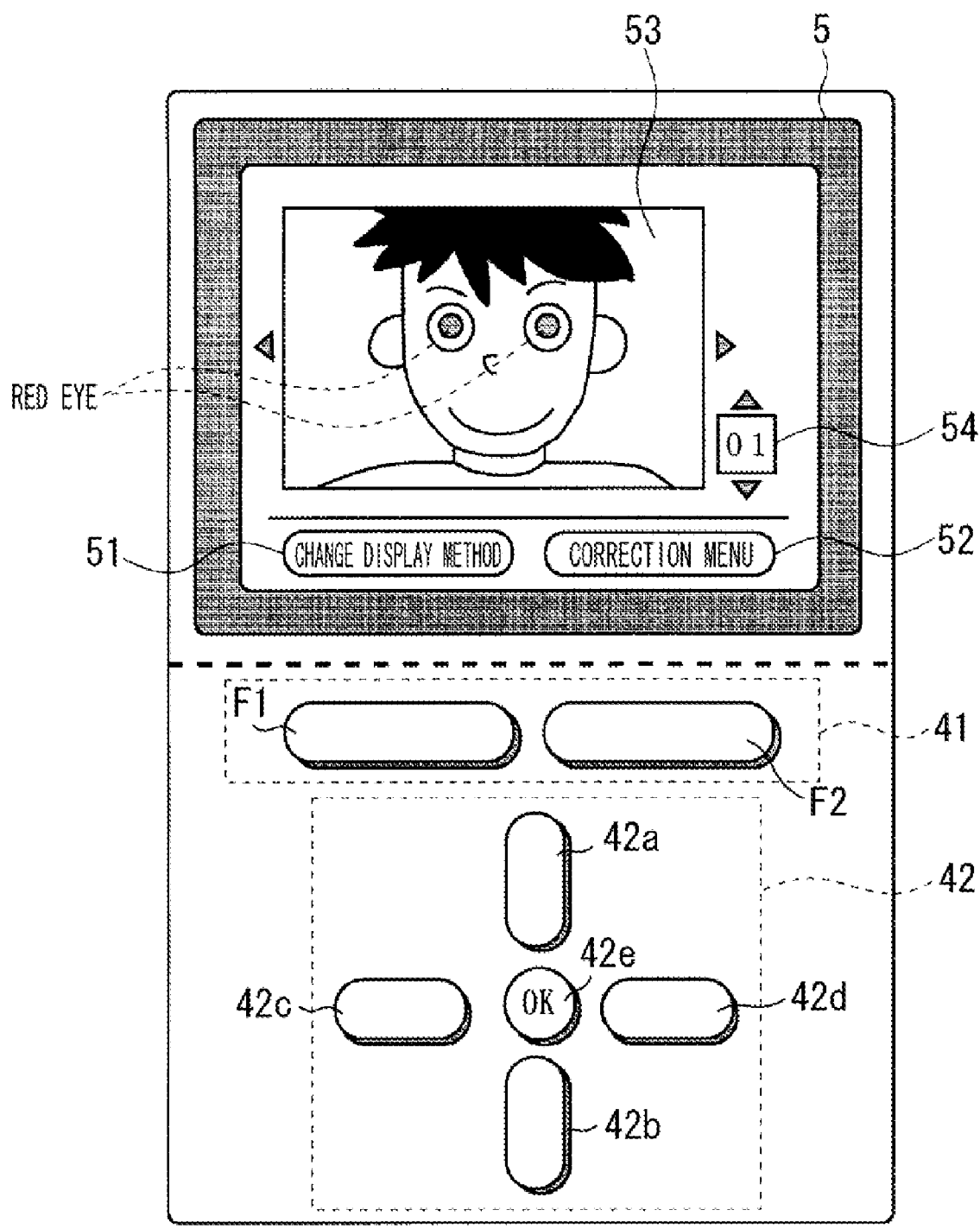
FIG. 3 illustrates the display device that shows that an image to be printed is selected according to the exemplary embodiment of the present invention.

FIG. 3 illustrates a state in which a print target image is displayed on the display device 5.

When the user selects a selection item "select and print image," the state illustrated in FIG. 3 is displayed. The user can designate the number of prints of each image via the screen in FIG. 3. Every time the user presses the left key 42c and right key 42d, an image displayed in an image display area 53 shifts to a next image. Thus, the user selects a desired number of prints for each image. When the user presses the up key 42a and down key 42b, the print number displayed in a print number display area 54 is changed. Thus, the user sets the desired print number.

When the selection of print target images and the setting of the print number of each image are completed and the user presses the OK key 42e, the processing shifts to a next step.

The display device 5 displays an outline of the function keys 41 and guidance items 51 and 52. The user can only operate the function keys 41 when the guidance items 51 and 52 are displayed.

Figure 4A:
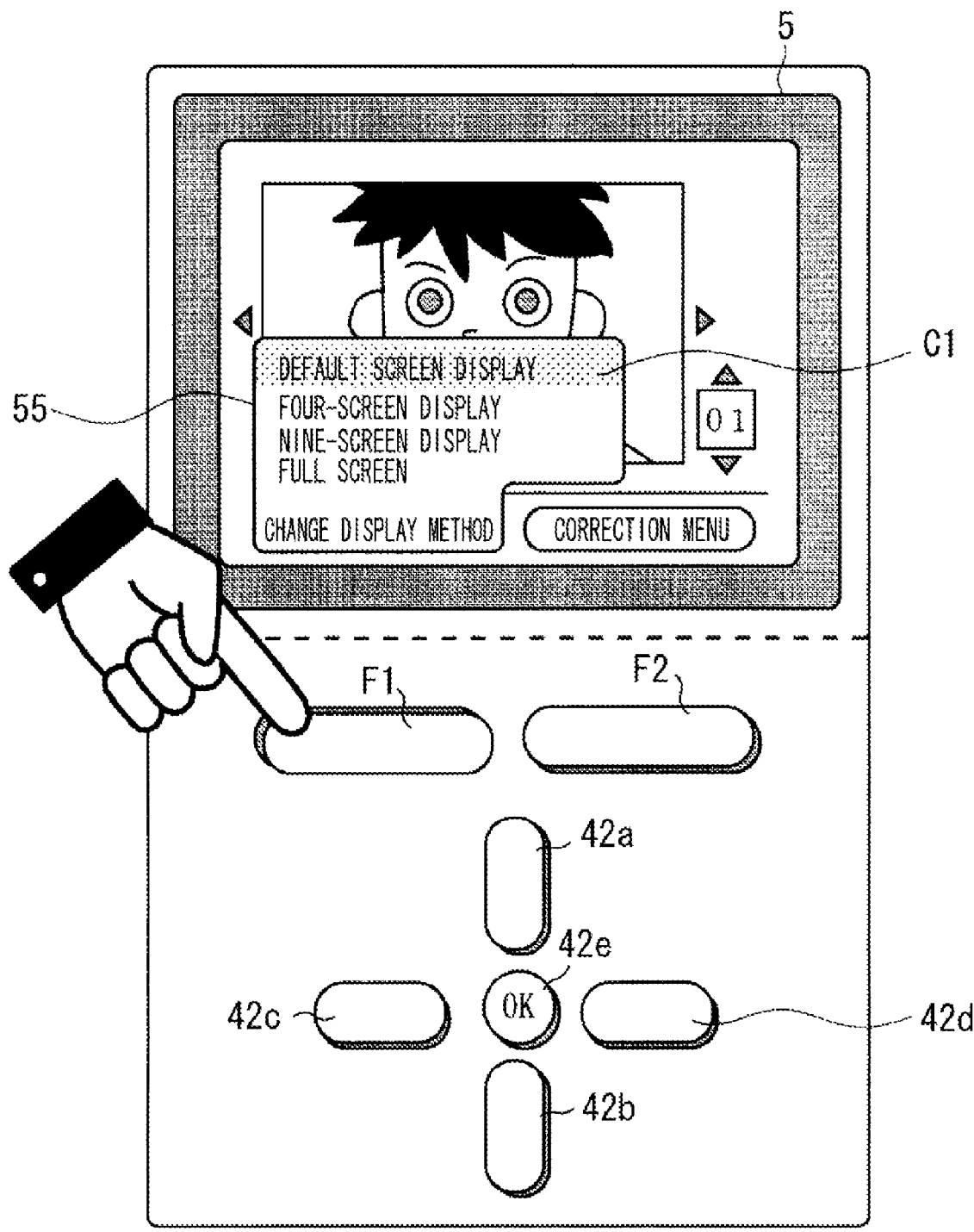
FIG. 4A illustrates a state in which a user in FIG. 3 presses a function key according to the exemplary embodiment of the present invention.

FIG. 4A illustrates a state in which the user has pressed the function key F1 in FIG. 3 in order to view the change display method menu as indicated by the guidance 51 above the function key F1.

Figure 4B:
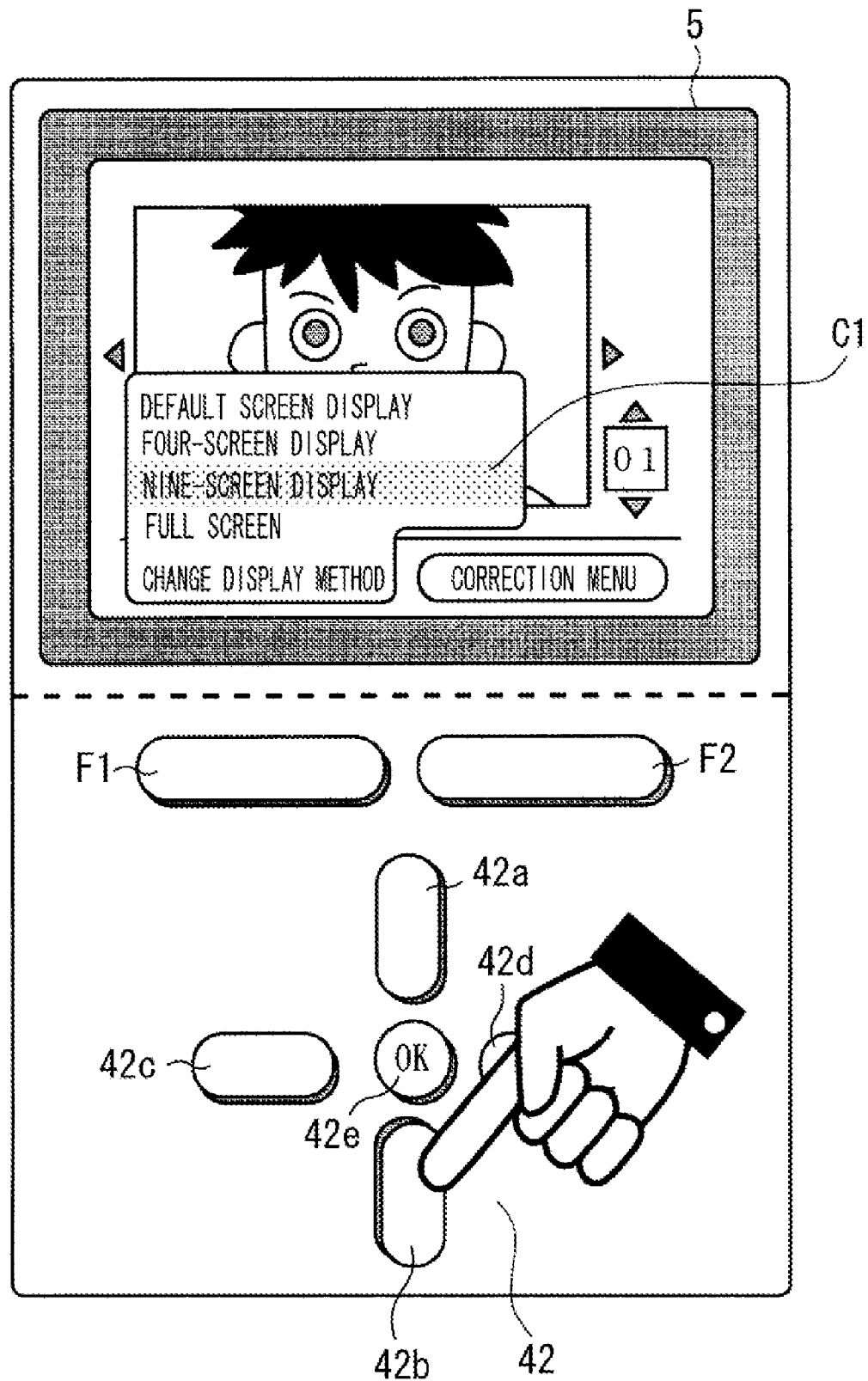
FIG. 4B illustrates a state in which a "down" key is pressed by the user in FIG. 4A to shift the focusing of a cursor to an item "nine-screen display" according to the exemplary embodiment of the present invention.

FIG. 4B illustrates a state in which the user has pressed the down key 42b in FIG. 4A to shift the focusing state of the cursor C1 to the items of a "nine-screen display."

For example, in the state illustrated in FIG. 3, when the user presses the function key F1, the display device 5 displays a function menu 55 in FIG. 4A, via which the display method can be changed.

The function menu 55 will be described below.

When the user presses the function key F2, the display device 5 displays a correction menu (FIG. 6A) via which a correction method can be selected (described later).

In this state, as illustrated in FIG. 4A, the function menu 55 is displayed. Then, the user presses the up and down keys 42a and 42b to operate the cursor C1, and selects the display method of the item selected at the time the OK key 42e is pressed. In FIG. 4A, the cursor C1 is focused to an item "default screen display," which is a previous display method.

Figure 5:
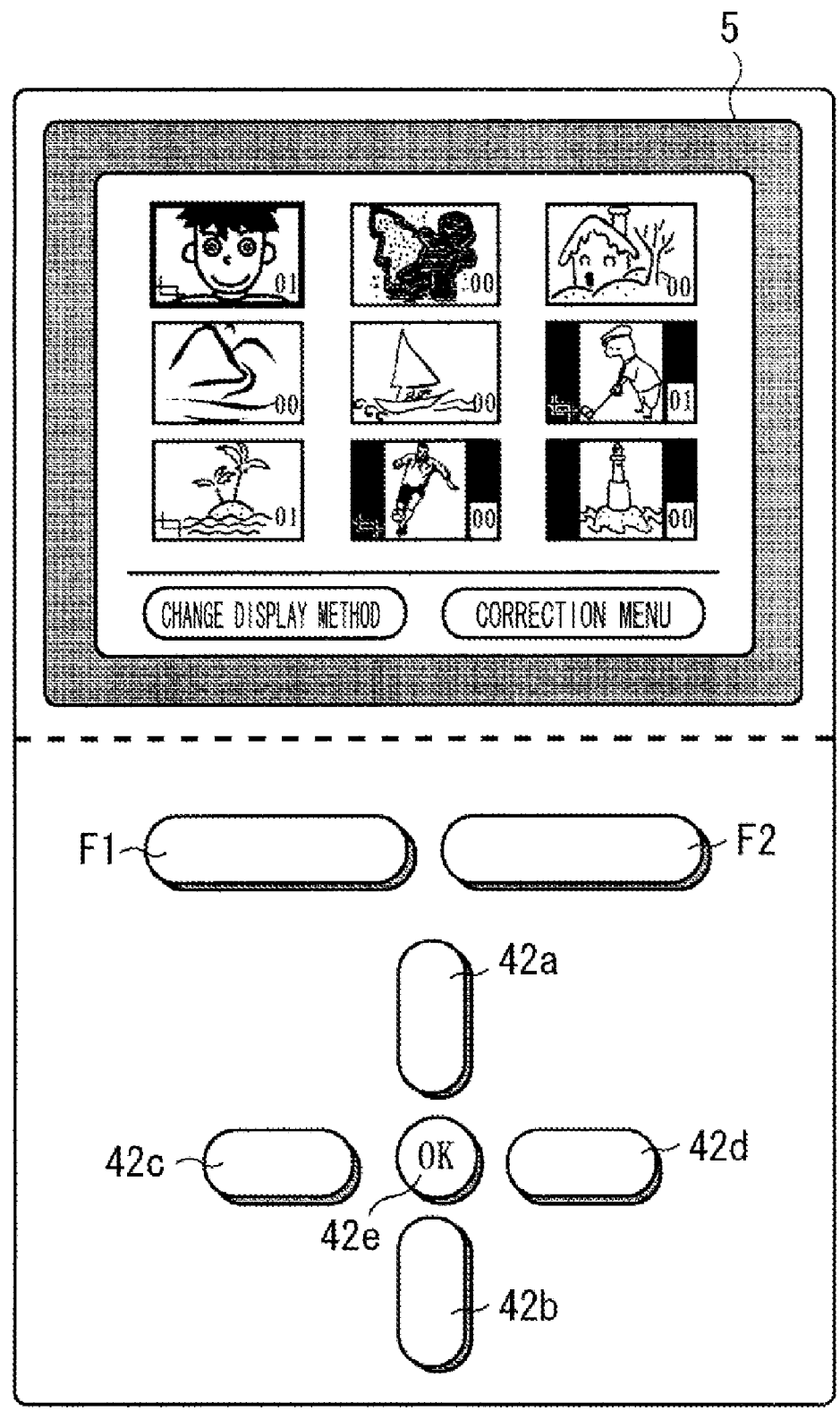
FIG. 5 illustrates a state immediately after an OK key is pressed by the user in FIG. 4B according to the exemplary embodiment of the present invention.

FIG. 5 illustrates a state immediately after the OK key 42e is pressed in FIG. 4B.

When the user selects the "nine-screen display," the display device 5 displays nine images. In this state, the up/down/left/right keys 42a, 42b, 42c, and 42d are used for selecting an image. In FIG. 5, the image displayed in an upper left position on the screen is surrounded with a thick line rectangle, which indicates that the image is an object of the user operation.

When the user presses a print number up/down key (not shown), the user can designate the number of prints of the operation target image. The user can change the display method and select the correction method by operating the function keys F1 and F2.

Now, an operation of the function key F2 will be described below.

Figure 6A:
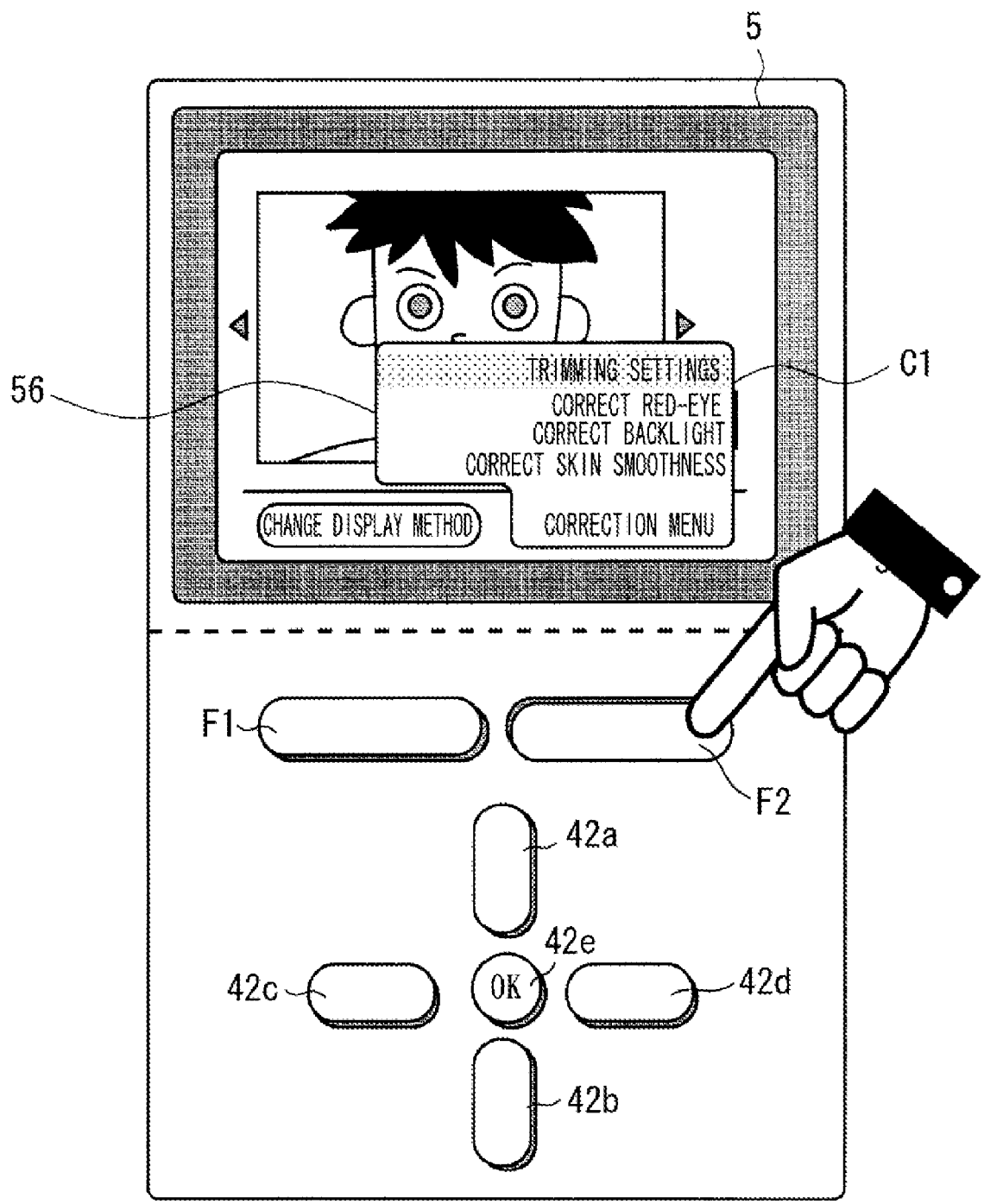
FIG. 6A illustrates a state before focusing of the cursor is shifted to an item "correct red-eye" according to the exemplary embodiment of the present invention.

FIG. 6A illustrates a state before the focusing of the cursor C1 is shifted to an item "correct red-eye."

Figure 6B:
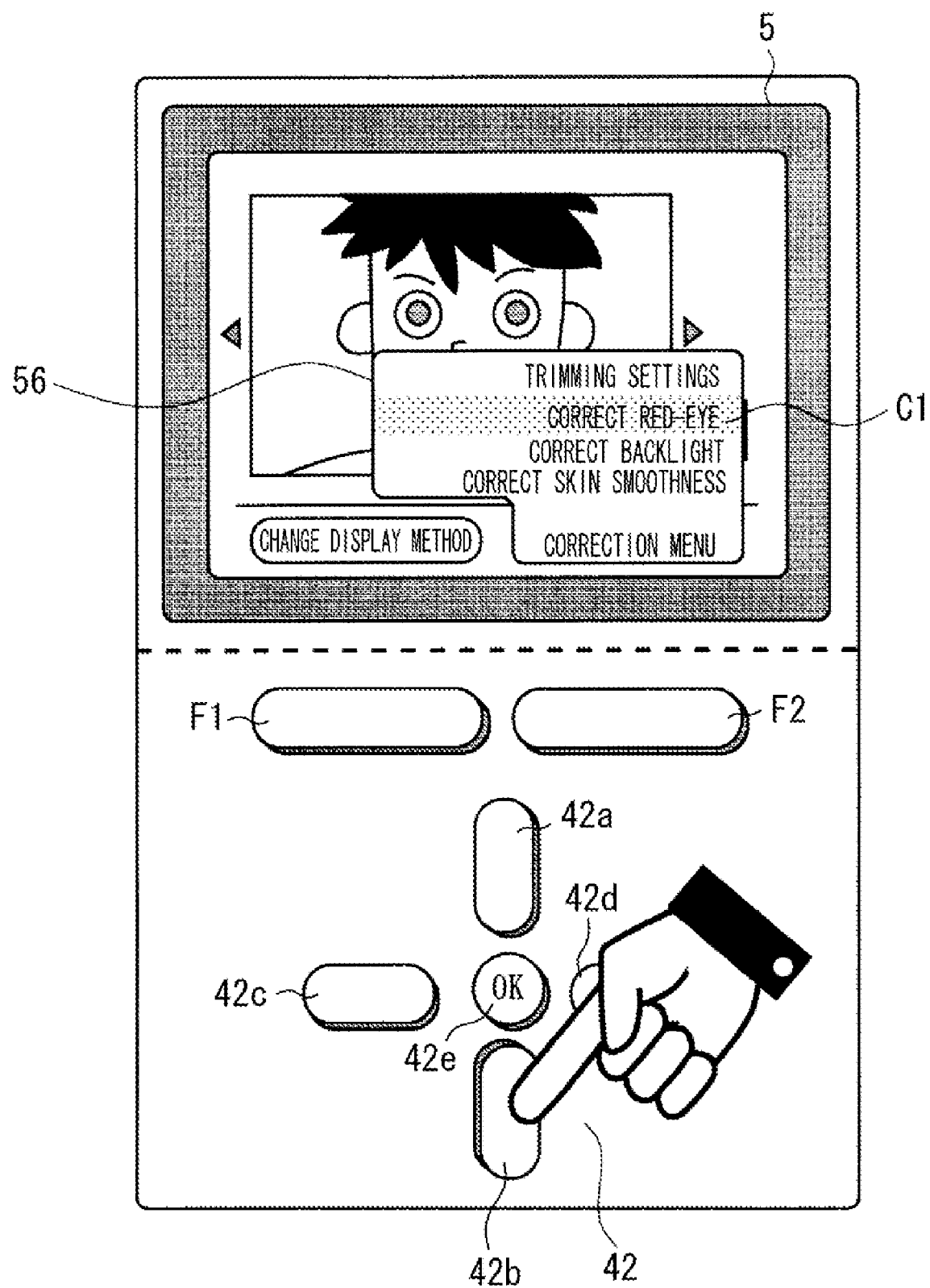
FIG. 6B illustrates a state in which when the user presses the down key in FIG. 6A, the focusing of the cursor is shifted to the item "correct red-eye" according to the exemplary embodiment of the present invention.

FIG. 6B illustrates a state in which the focusing of the cursor C1 is shifted to the item "correct red-eye" when the user operates the down key 42b in FIG. 6A.

When the user presses the function key F2 in FIG. 4A, a correction menu 56 is displayed on the display device 5 as illustrated in FIG. 6A. In the present exemplary embodiment, the selectable correction methods include "trimming settings," "correct red-eye," "correct backlight," and "correct skin smoothness." The operation for selecting the correction methods is similar to the operation in the function menu 55. That is, the user operates the cursor C1 with the up/down keys 42a and 42b and selects the correction method by pressing the OK key 42e.

The user selects the item "correct red-eye" to correct the red-eye appearing on a person included in the image. The user selects the item "correct backlight" to correct backlight occurring on the image. With the backlight correction function, the image processing apparatus PR1 detects that backlight has occurred on the image, by extracting the person included in the image. The backlight is corrected based on the skin color of the person in the image. The user selects the item "correct skin smoothness" to correct smoothness of the portion of the image corresponding to the skin of the person in the image. With the skin smoothness correction function, the image processing apparatus PR1 detects a liver spot, a mole, and a wrinkle on the skin of the person in the image and perform correction to show more smooth skin.

Furthermore, selectable correction methods can include embedding date and time in the image according to photographic information included in the image.

When the user presses the OK key 42e in the state illustrated in FIG. 6B, the image processing apparatus PR1 extracts the face of the person in the selected image to detect the position of the face. Then, the image processing apparatus PR1 detects the position of the eyes of the person. If it is detected that red-eye phenomenon has occurred in the image, the image processing apparatus PR1 corrects the red-eye by substituting the pixel of a specific color with a black pixel.

Figure 7:
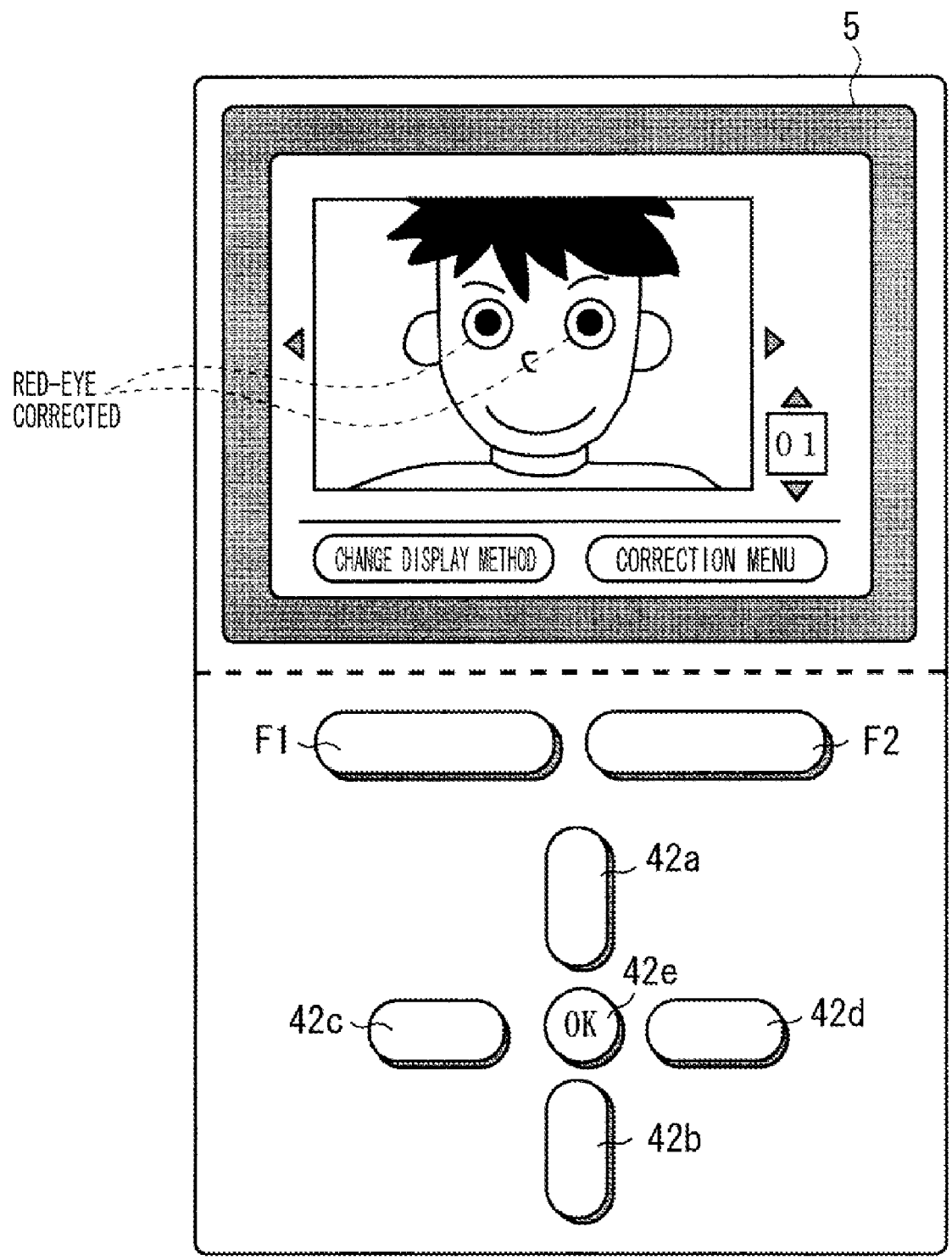
FIG. 7 illustrates a state in which the red-eye correction is completed after the user presses the OK key in FIG. 6B according to the exemplary embodiment of the present invention.

FIG. 7 illustrates a state after the correction of red-eye is completed upon pressing of the OK key 42e in FIG. 6B.

Figure 8A:
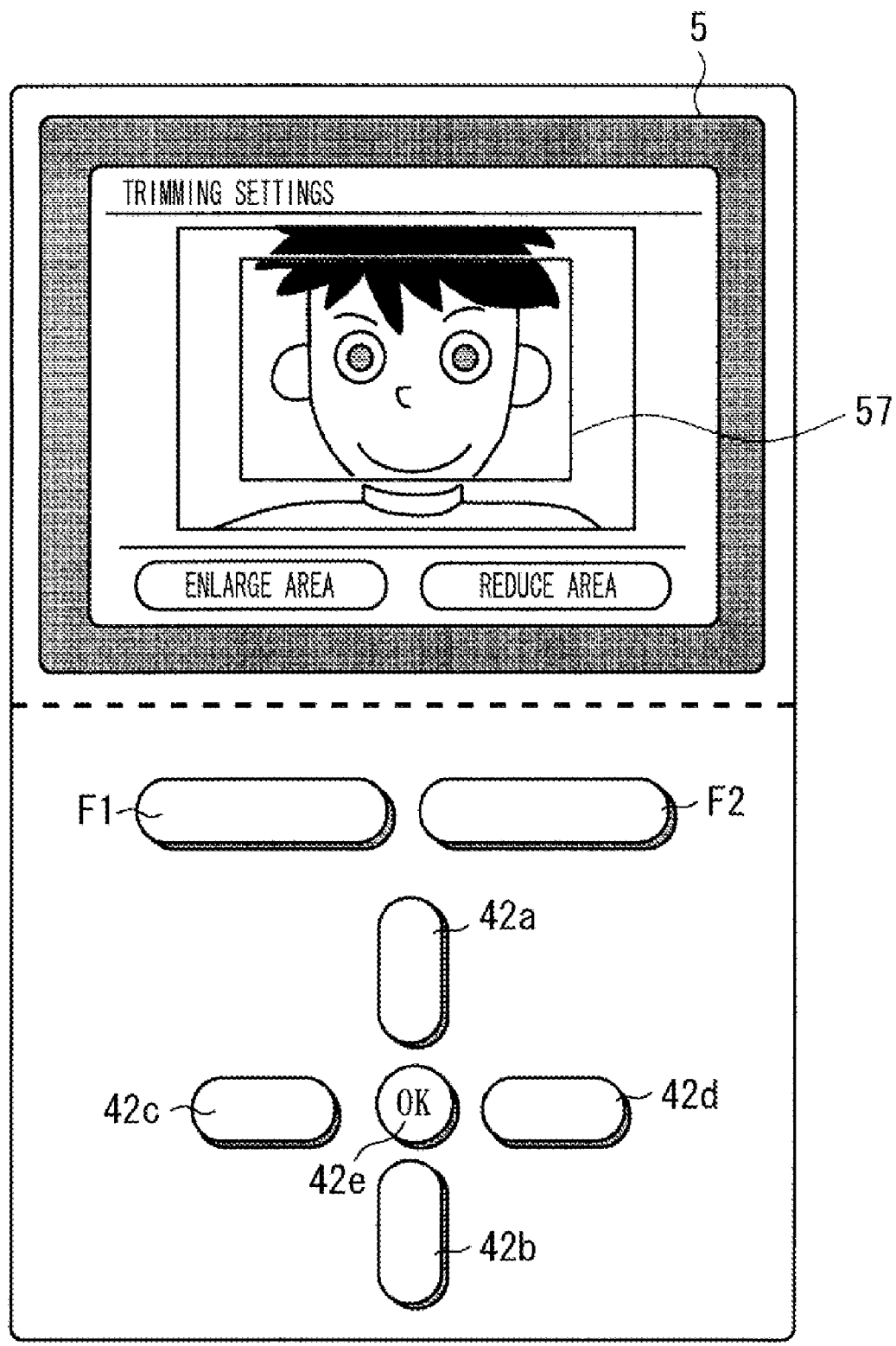
FIG. 8A illustrates an example of a "trimming settings" screen according to the exemplary embodiment of the present invention.

FIG. 8A illustrates a "trimming settings" screen.

When the user presses the OK key 42e in the state in which the cursor C1 is focused on the item "trimming settings" in the correction menu 56 illustrated in FIG. 6A, the screen shifts to the "trimming settings" screen illustrated in FIG. 8A.

In the state illustrated in FIG. 8A, a trimming area 57 is displayed in an overlapping manner on the selected image, and the user designates the position of the trimming area 57 by operating the up/down/left/right keys 42a, 42b, 42c, and 42d.

Figure 8B:
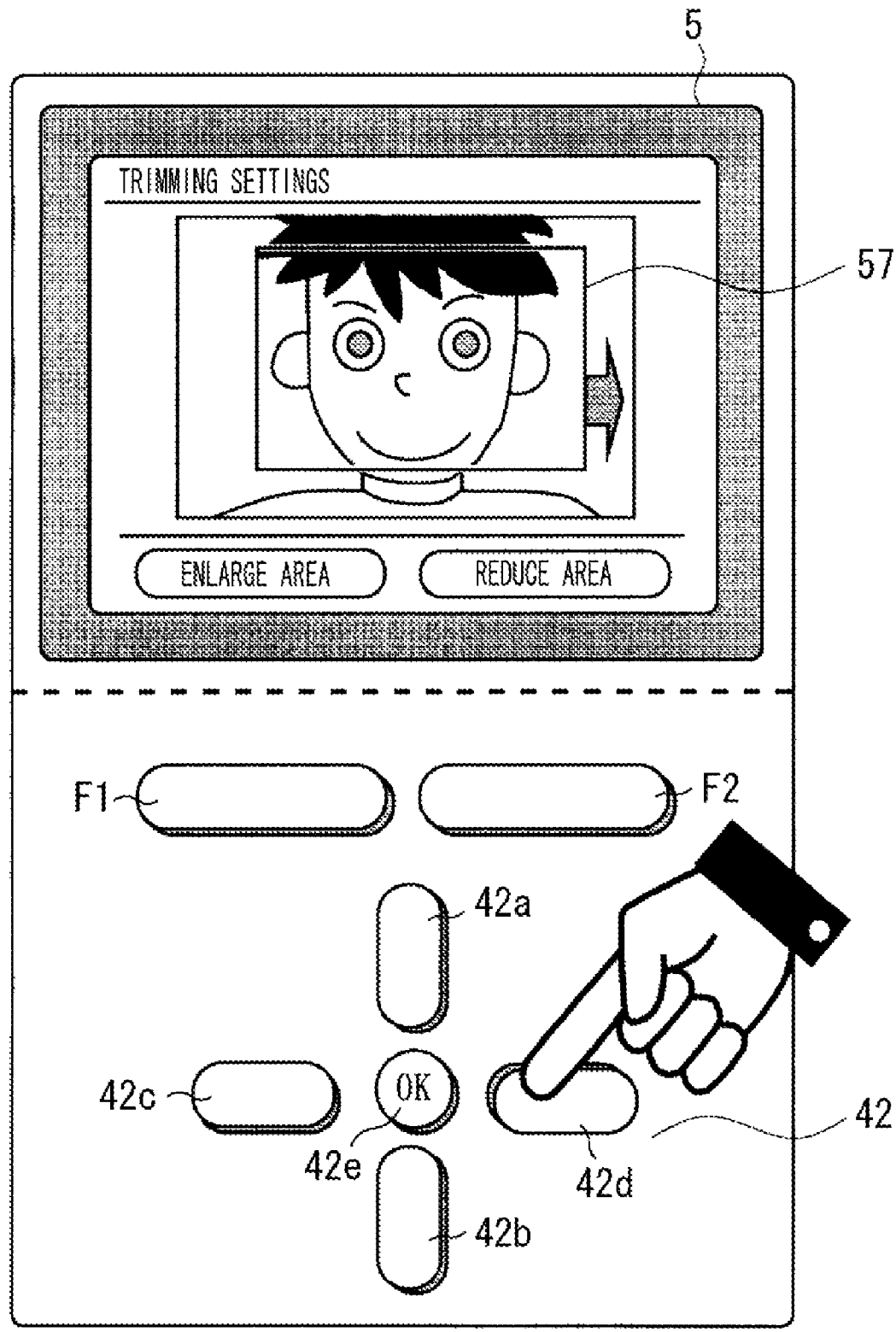
FIG. 8B illustrates a state in which when the user presses a "right" key once in FIG. 8A, a trimming area is moved to the right by one positional unit according to the exemplary embodiment of the present invention.

FIG. 8B illustrates a state in which when the user presses the right key 42d once in FIG. 8A, the trimming area 57 is moved to the right by one positional unit.

In this state, the user uses the function keys F1 and F2 to enlarge and reduce the trimming area 57.

Figure 9:
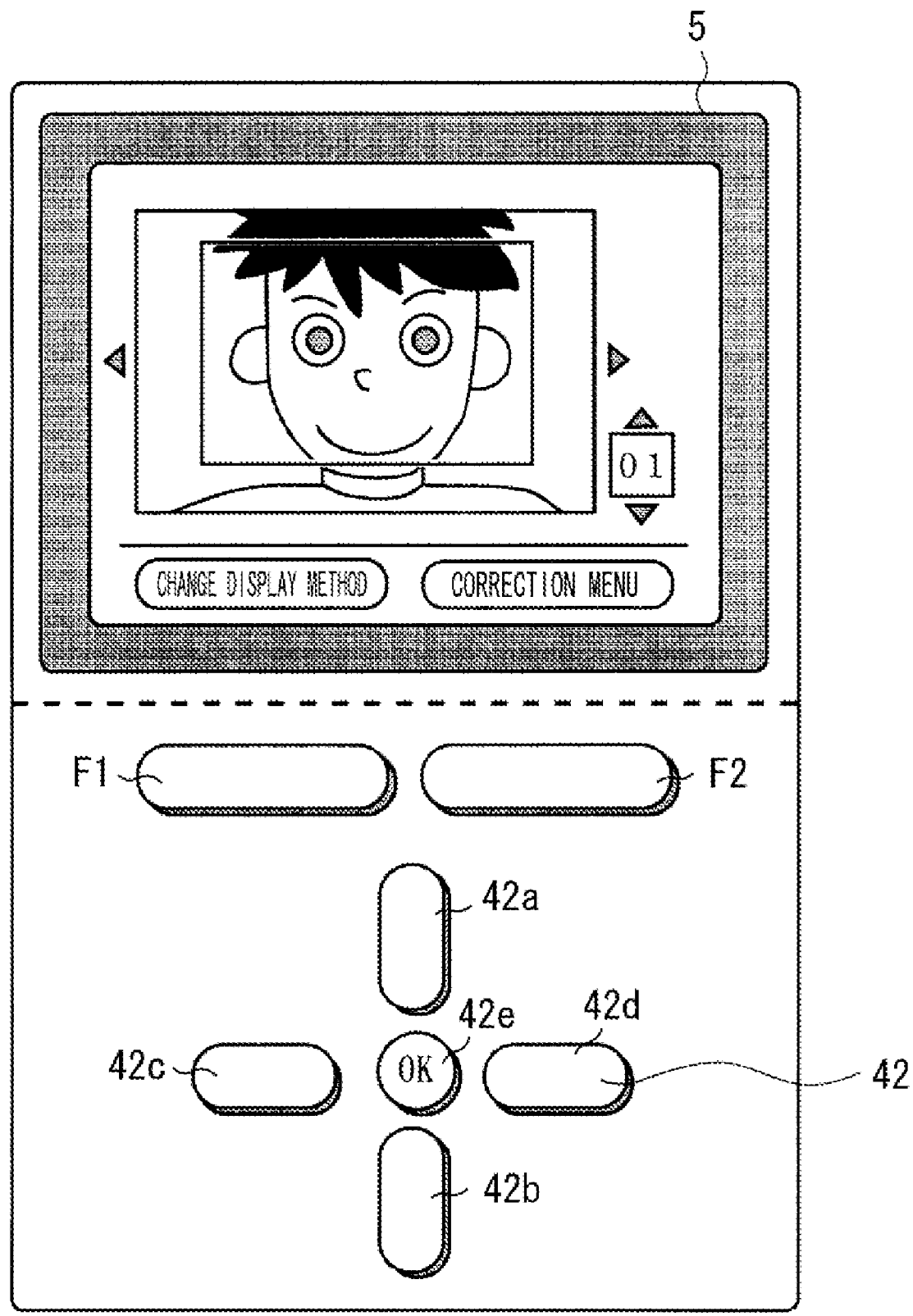
FIG. 9 illustrates a state in which a finally designated trimming area is displayed in an overlapping manner on a selected image according to the exemplary embodiment of the present invention.

FIG. 9 illustrates a state in which the finally determined trimming area 57 is displayed in the overlapping manner on the selected image.

When the user has finally designated the desired trimming area 57 in the display state illustrated in FIG. 8A and presses the OK key 42e, the screen shifts from the "trimming settings" screen to the previous screen. In this state, the finally designated trimming area 57 is displayed in the overlapping manner on the image. When the image is printed, the portion of the image clipped according to the finally determined trimming area 57 is printed.

Figure 10:
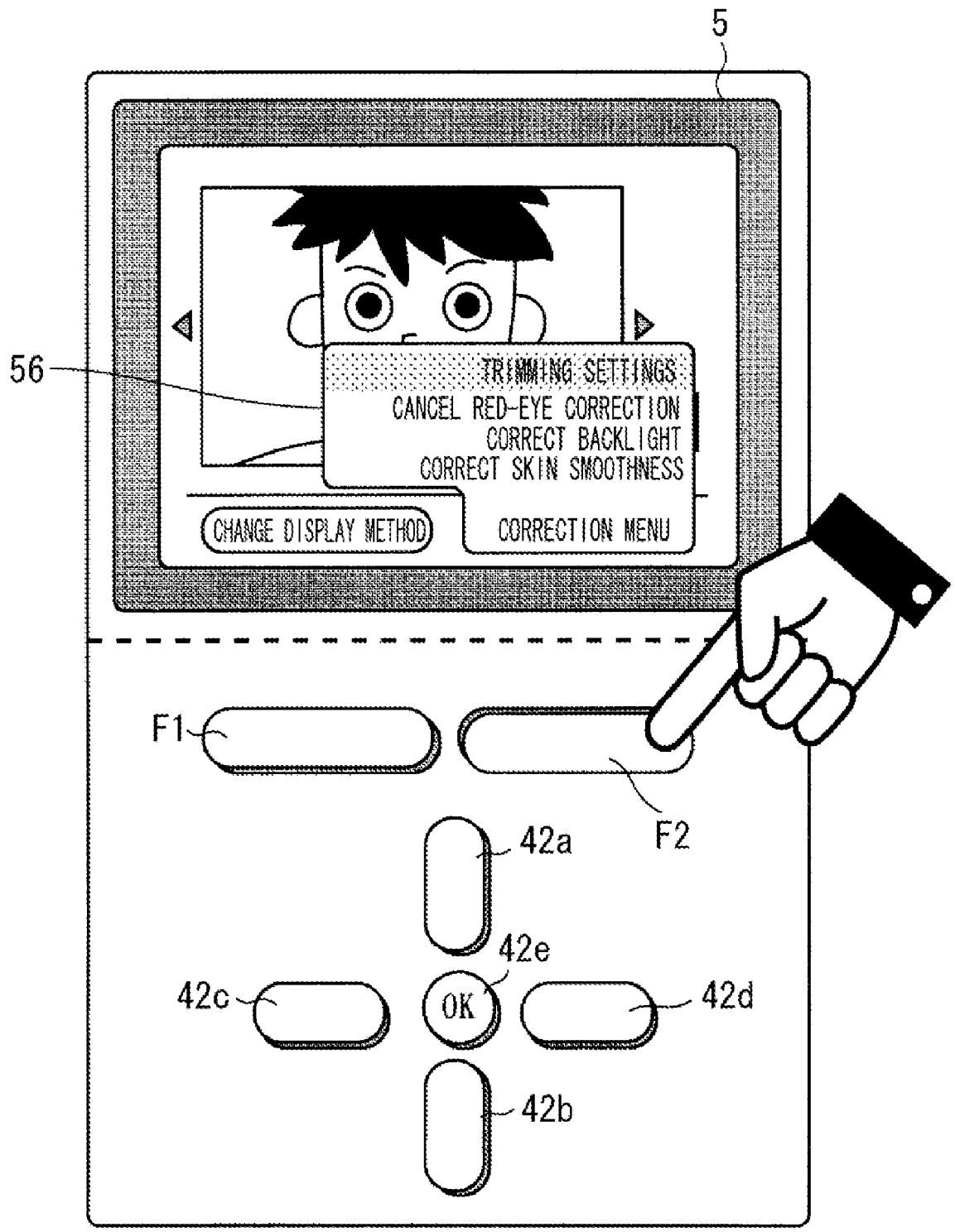
FIG. 10 illustrates a state in which the item "correct red-eye" in a function menu is substituted with an item "cancel red-eye correction" according to the exemplary embodiment of the present invention.

FIG. 10 illustrates a state in which the item "correct red-eye" in the correction menu 56 is substituted with an item "cancel red-eye correction." If the user presses the function key F2 when the image is displayed on which red-eye correction has already been performed, the item "correct red-eye" in the correction menu 56 is substituted with the item "cancel red-eye correction" as illustrated in FIG. 10.

Figure 11:
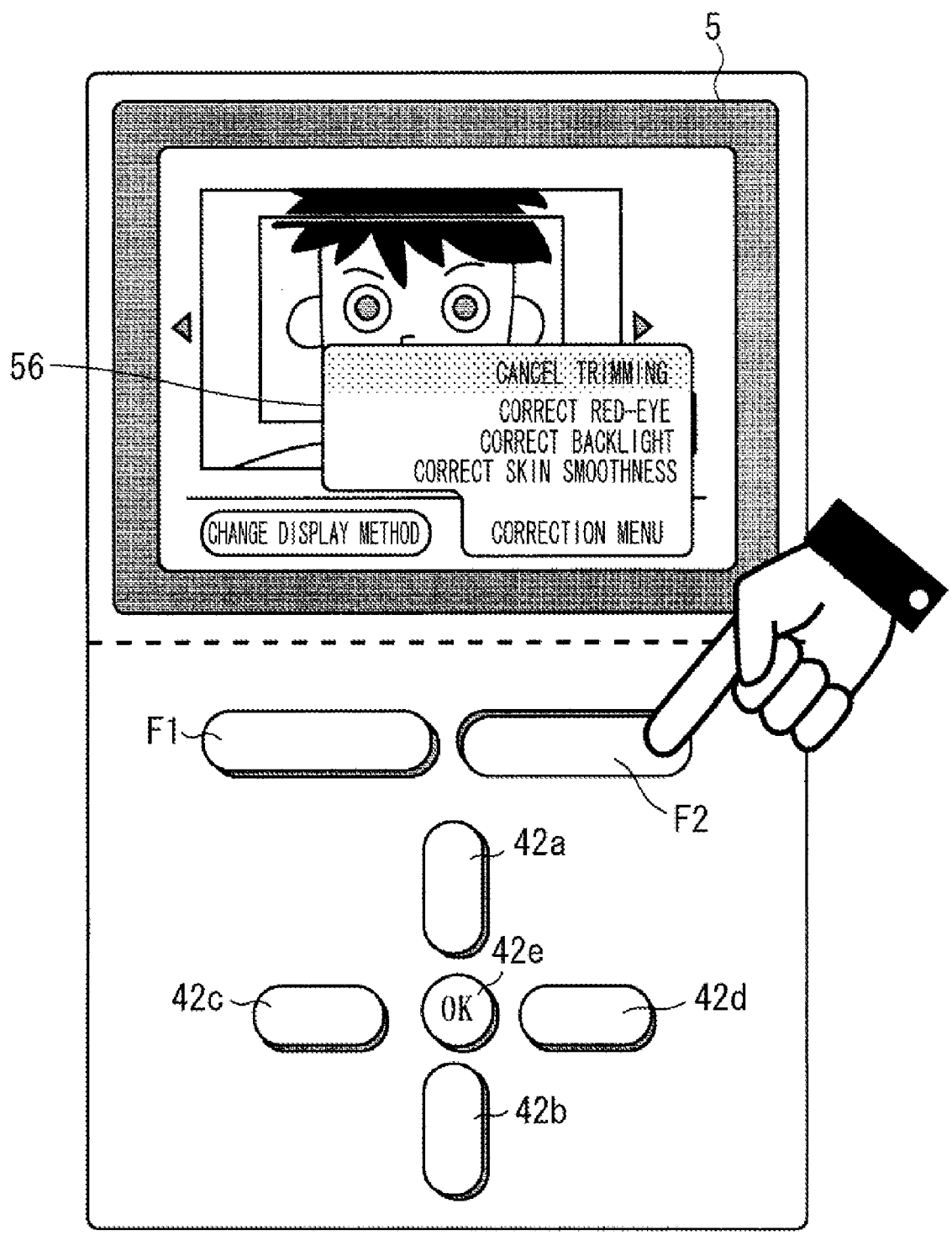
FIG. 11 illustrates a state in which the item "trimming settings" in the function menu is substituted with an item "cancel trimming" according to the exemplary embodiment of the present invention.

FIG. 11 illustrates a state in which the item "trimming settings" in the correction menu 56 is substituted with an item "cancel trimming."

If the user presses the function key F2 when the trimming area 57 has already been designated, the item "trimming settings" in the correction menu 56 is substituted with the item "cancel trimming" as illustrated in FIG. 11.

With respect to the other correction methods, the operation similar to the operation described above is performed.

Figure 12:
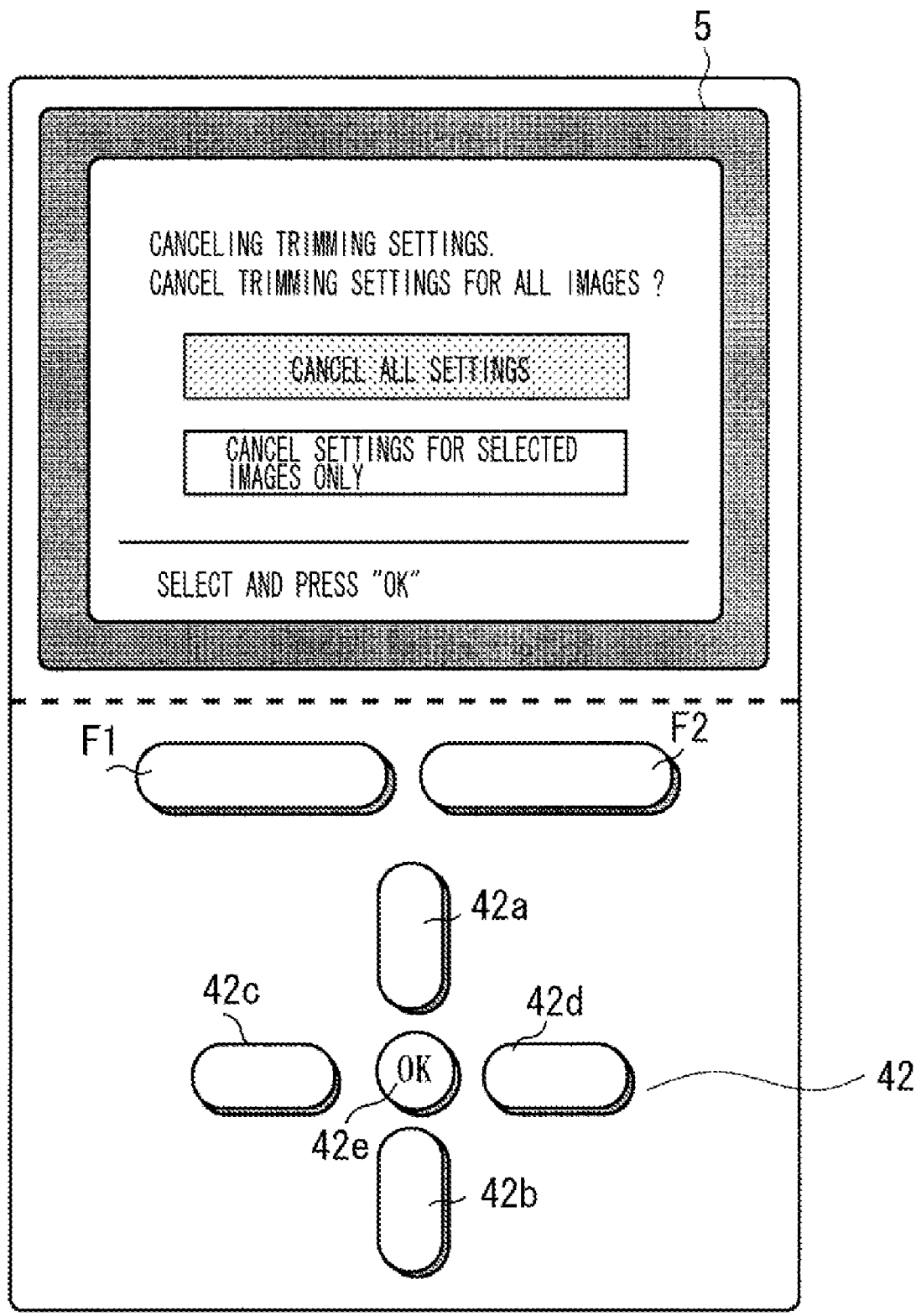
FIG. 12 illustrates a display after the user selects the item "cancel trimming" according to the exemplary embodiment of the present invention.

FIG. 12 illustrates a state of display after the item "cancel trimming" is selected by the user.

When the user selects the item "cancel trimming" in the state illustrated in FIG. 11, the screen shifts to the screen illustrated in FIG. 12. On the screen illustrated in FIG. 12, the user operates the up/down keys 42a and 42b to designate whether the canceling of trimming is performed only on the currently selected image or on all the images already designated to be trimmed. When the user presses the OK key 42e after performing the designation, the trimming setting for the selected image is cancelled.

In the description above, the canceling of the designation for the trimming area is explained as an example. The similar operation is performed in the case of canceling the designation for "red-eye correction." That is, the user can designate whether the designation for the "red-eye correction" is to be cancelled for all the images on which red-eye correction is designated, or only for the currently selected image.

As described above, when the user has performed a correction such as red-eye correction and trimming, the image corrected for red-eye is displayed (FIG. 7) and the trimming area 57 is displayed in the overlapping manner on the image (FIG. 9).

Figure 13A:
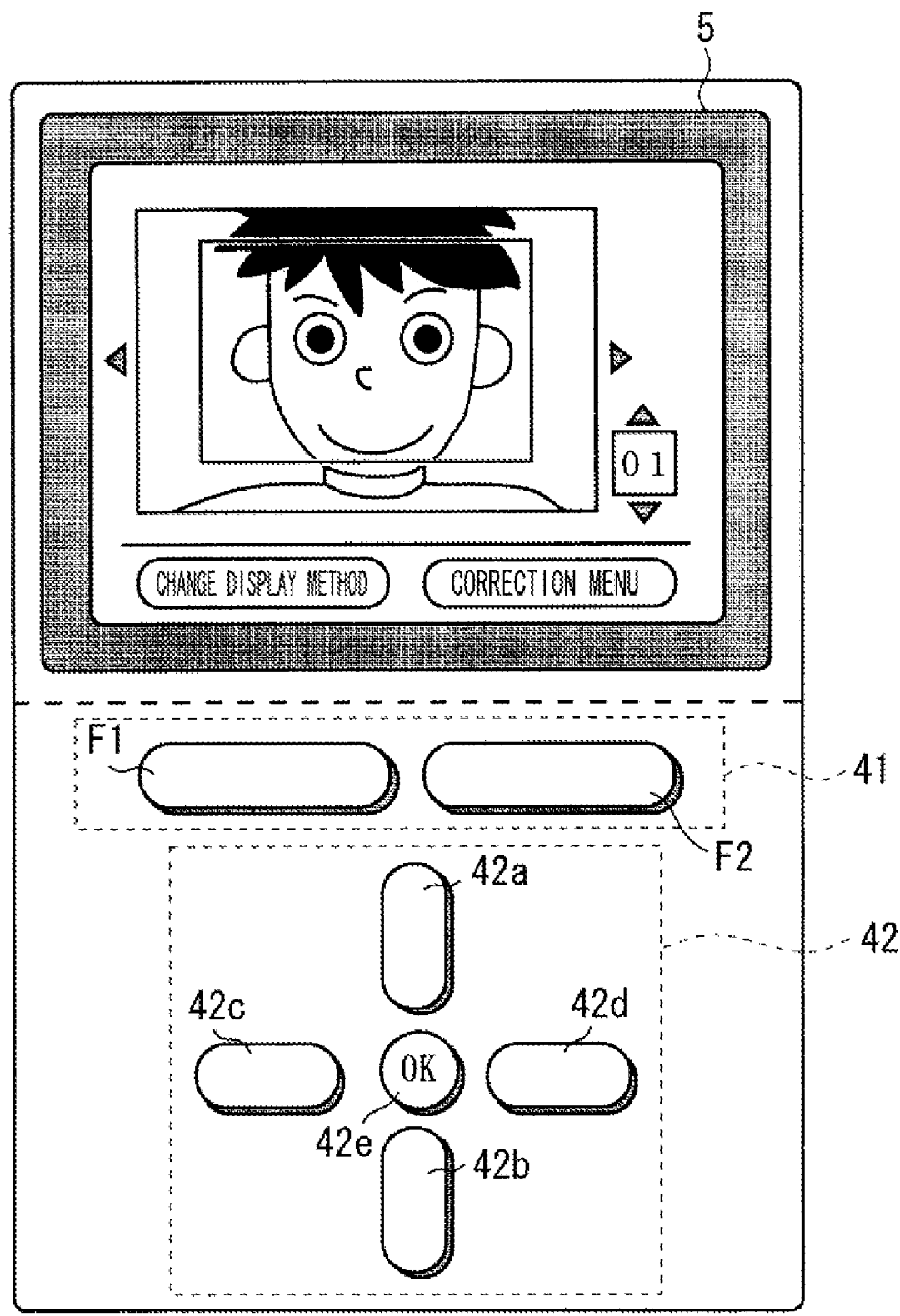
FIG. 13A illustrates a state in which red-eye correction and trimming correction are designated at the same time according to the exemplary embodiment of the present invention.

FIG. 13A illustrates a state in which red-eye correction and trimming are designated at the same time.

In the state illustrated in FIG. 13A, when the user selects the item "nine-screen display" via the correction menu 56, the image corrected for red-eye and the trimming area 57 overlapping with the image cannot be effectively displayed. Because the size of each of the nine images is small, visibility is low and likelihood of an error in designation is large.

Figure 13B:
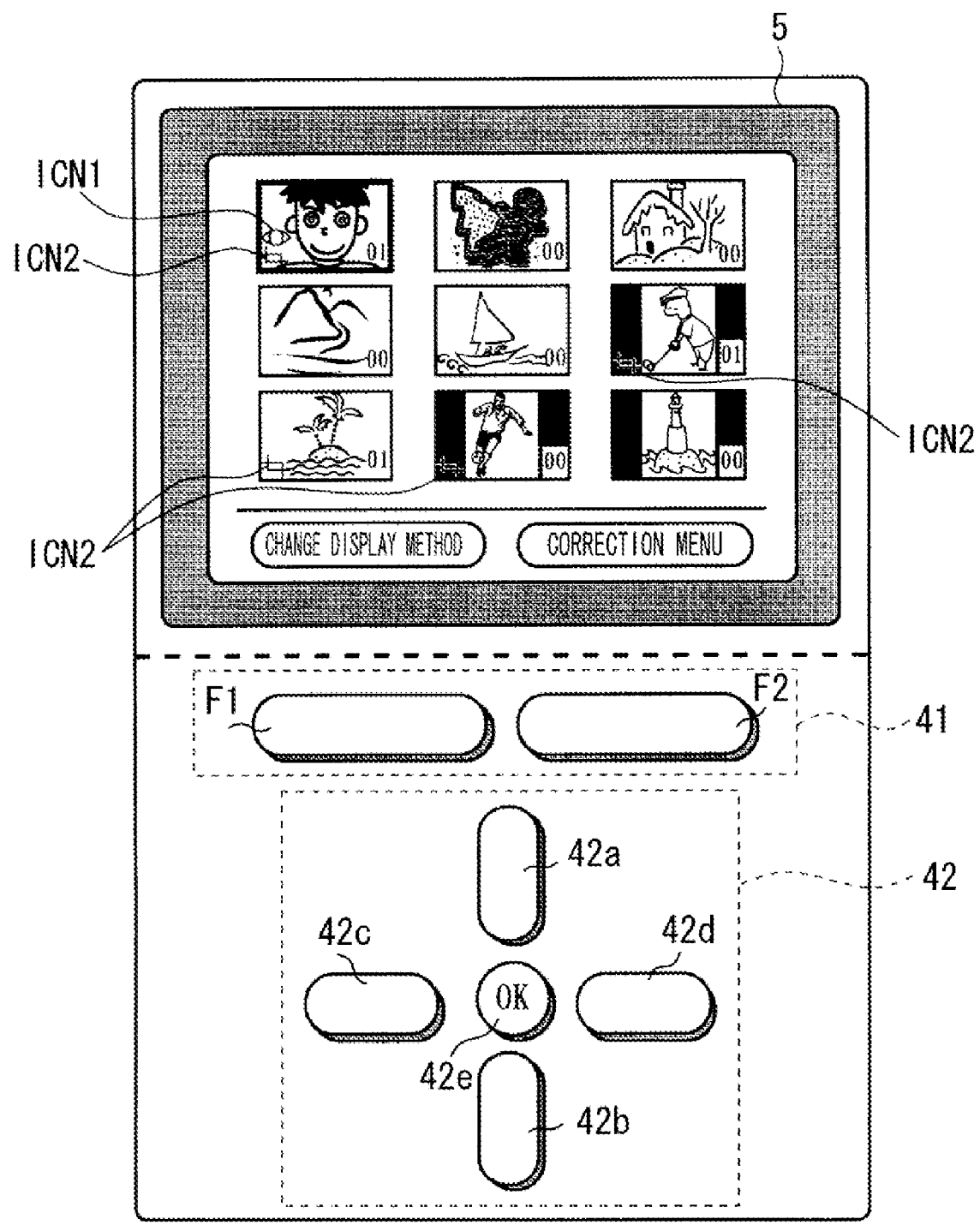
FIG. 13B illustrates a state in which each icon indicating that each correction has been set is displayed in an overlapping manner on each image according to the exemplary embodiment of the present invention.

FIG. 13B illustrates a state in which icons ICN1 and ICN2 indicating that correction has been set are displayed in the overlapping manner on each image.

As illustrated in FIG. 13B, when the nine-screen display is performed, the icons ICN1 and ICN2 indicating that correction has been set are displayed in the overlapping manner on each image. The ICN1 indicates that red-eye correction has been set. The ICN2 indicates that trimming setting has been performed.

Thus, in the present exemplary embodiment, the method of displaying an image is switched according to the mode of displaying a screen. The physical display size of an image differs according to the size of the liquid crystal display. Accordingly, a unit for determining the size of the display target image can be provided to decide whether the display using an icon is to be displayed or not according to the determined size of the display target image.

Figure 14:
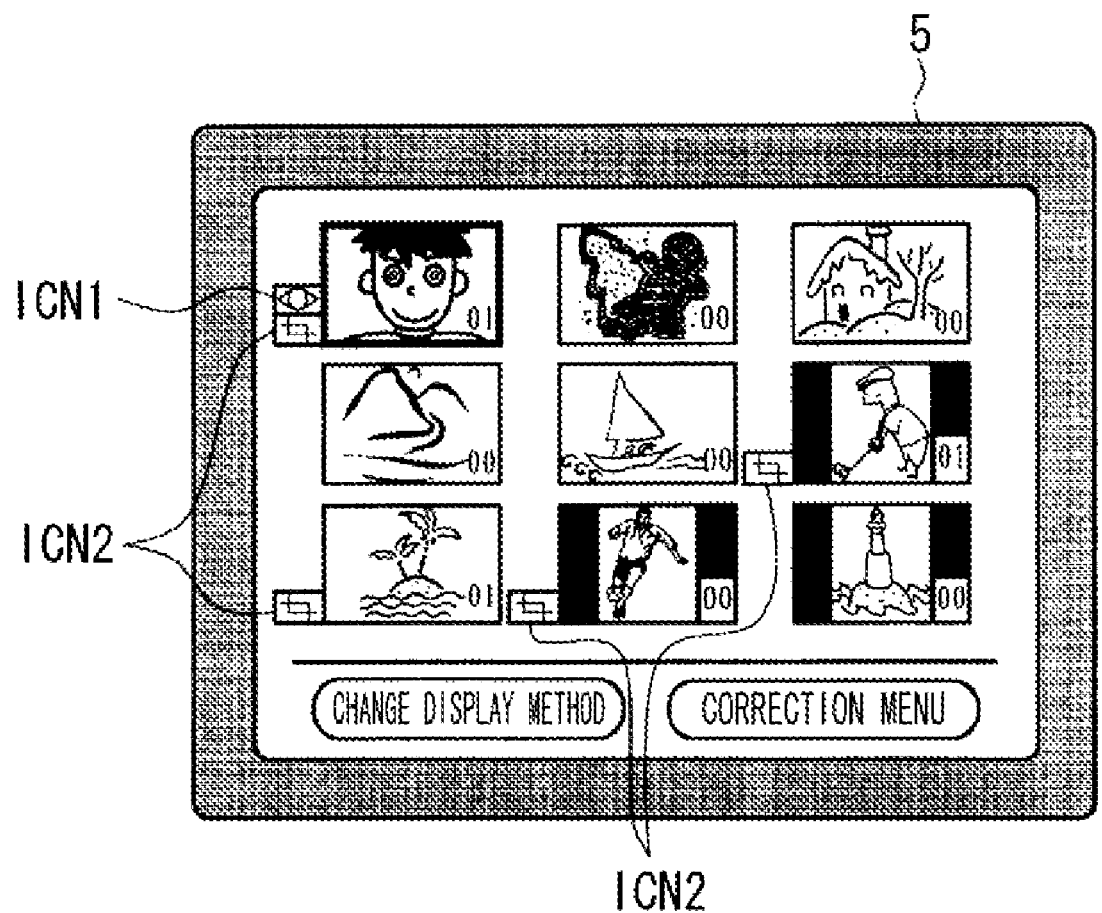
FIG. 14 illustrates an example in which each icon is displayed at a position close to the image according to the exemplary embodiment of the present invention.

FIG. 14 illustrates an example in which the icons ICN1 and ICN2 are displayed at a position close to the image.

In the present exemplary embodiment, when nine screens are displayed, the icons ICN1 and ICN2 indicating that correction has been performed are displayed in the overlapping manner on each image. However, the icons ICN1 and ICN2 can be displayed at a position close to the image.

When trimming is performed for trimming the image with a rectangle for a print area, the size of the trimming area is changed according to the designation on the trimming area by the user while the aspect ratio is the same as the print area. In this case, print magnification can be computed according to the sizes of the print area and the trimming area at the time printing starts. Based on the computed print magnification, magnification process can be performed to print the image in the trimming area within digital image data.

According to the present exemplary embodiment, the display of information about whether the setting for correcting each image is performed, is switched according to the display method of the image. Thus, in the case of displaying one image, the user can easily confirm that the correction has been performed on the displayed image. Furthermore, in the case of displaying multiple images, an icon is displayed in an overlapping manner on each image (or near each image) to indicate that the correction has been performed on the image. Thus, the image can be displayed at a high visibility, without deteriorating the browsability.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-168354 filed Jun. 19, 2006, which is hereby incorporated by reference herein in its entirety.

What is claimed is:

1. An image processing apparatus comprising:
   a display control unit configured to cause a display apparatus to display a plurality of images either in a one-image display mode in which the plurality of images are displayed one by one in a display screen of the display apparatus or in a multi-images display mode in which the plurality of images are displayed in the display screen at the same time;
   an inputting unit configured to input an instruction by a user for designating an editing process for at least one of the plurality of images displayed by the display apparatus, the inputting unit being capable of inputting the instruction in the multi images display mode without changing the display mode to the one-image display mode;
   an editing unit configured to edit at least one of the plurality of images according to the input instruction; and
   an adding unit configured to, in a case where the instruction for designating an editing process for at least one of the plurality of images is input by the inputting unit in the multi-images display mode, add to the at least one of the plurality of images at least one display item indicating a content of the editing process which is already designated by the instruction.

2. The image processing apparatus according to claim 1, wherein the adding unit adds the at least one display item indicating the content of the editing process at a position close to at least one image for which the editing process has been designated by the instruction.

3. The image processing apparatus according to claim 1, wherein the adding unit adds the at least one display item indicating the content of the editing process, overlapping with at least one image for which the editing process has been designated by the instruction.

4. The image processing apparatus according to claim 1, further comprising a determining unit configured to determine a size of an image to be displayed, wherein the adding unit adds the at least one display item according to the size of the image determined by the determining unit.

5. The image processing apparatus according to claim 1, wherein the editing unit includes a unit for correcting red-eye appearing on a person included in the image.

6. The image processing apparatus according to claim 1, wherein the editing unit includes a unit for correcting backlight according to a skin color of a person included in the image.

7. The image processing apparatus according to claim 1, wherein the editing unit includes a unit configured to perform correction for smoothing skin of a person included in the image.

8. The image processing apparatus according to claim 1, wherein the editing unit includes a unit configured to embed information about date and time in the image.

9. The image processing apparatus according to claim 1, wherein the editing unit includes a trimming unit configured to clip an area of the image data.

10. A method for controlling an image processing apparatus capable of displaying image data on a display apparatus, the image data comprising a plurality of images displayed either in a one-image display mode in which the plurality of images are displayed one by one in a display screen of the display apparatus or in a multi-images display mode in which the plurality of images are displayed at the same time, the method comprising:
   inputting an instruction by a user, for designating an editing process for at least one of the plurality of images displayed on the display apparatus, the instruction being capable of being input in the multi images display mode without changing the display mode to the one-image display mode;
   editing at least one of the plurality of images according to the input instruction;
   in a case where the instruction for designating an editing process for at least one of the plurality of images is input in the multi-images display mode, adding to the at least one of the plurality of images at least one display item indicating a content of the editing process which is already designated by the instruction.

11. The method according to claim 10, wherein the at least one display item indicating the content of the editing process is added at a position close to at least one image for which the editing process has been designated by the instruction.

12. The method according to claim 10, wherein the at least one display item indicating the content of the editing process, overlapping with at least one image for which the editing process has been designated by the instruction is executed.

13. The method according to claim 10, further comprising:
determining a size of an image to be displayed;
wherein the at least one display item is added according to the determined size of the image.

14. The method according to claim 10, wherein the editing includes correcting of red-eye appearing on a person included in the image.

15. The method according to claim 10, wherein the editing includes correcting of backlight according to a skin color of a person included in the image.

16. The method according to claim 10, wherein the editing includes correction for smoothing skin of a person included in the image.

17. The method according to claim 10, wherein the editing includes embedding of information about date and time in the image.

18. The method according to claim 10, wherein the editing includes clipping an area of the image data.

* * * * *